US006619406B1

(12) United States Patent
Kacyra et al.

(10) Patent No.: US 6,619,406 B1
(45) Date of Patent: Sep. 16, 2003

(54) ADVANCED APPLICATIONS FOR 3-D AUTOSCANNING LIDAR SYSTEM

(75) Inventors: Ben K. Kacyra, Orinda, CA (US); Jerry Dimsdale, Oakland, CA (US); Christopher Robin Thewalt, Oakland, CA (US)

(73) Assignee: Cyra Technologies, Inc., San Ramon, CA (US)

( * ) Notice: Subject to any disclaimer, the term of this patent is extended or adjusted under 35 U.S.C. 154(b) by 0 days.

(21) Appl. No.: 09/615,439

(22) Filed: Jul. 13, 2000

Related U.S. Application Data

(60) Provisional application No. 60/143,695, filed on Jul. 14, 1999.

(51) Int. Cl.[7] .............................. E02F 3/76; G06F 19/00
(52) U.S. Cl. ........................................ 172/4.5; 342/457
(58) Field of Search ............................ 342/457, 357.13, 342/357.17; 700/182, 184, 175; 701/50, 1, 207, 225; 702/82; 172/1, 2, 3, 4, 4.5, 6, 7; 37/907

(56) References Cited

U.S. PATENT DOCUMENTS

| | | | |
|---|---|---|---|
| 4,918,627 A | | 4/1990 | Garcia et al. |
| 5,337,149 A | | 8/1994 | Kozah et al. |
| 5,477,459 A | * | 12/1995 | Clegg et al. .............. 356/152.1 |
| 5,552,992 A | | 9/1996 | Hunter |
| 5,631,658 A | | 5/1997 | Gudat et al. |
| 5,771,978 A | * | 6/1998 | Davidson et al. ............... 172/2 |
| 6,052,181 A | * | 4/2000 | Maynard et al. ............ 356/147 |
| 6,112,145 A | * | 8/2000 | Zachman .................... 172/190 |
| 6,112,839 A | * | 9/2000 | Ostler et al. .................... 172/2 |

FOREIGN PATENT DOCUMENTS

| | | |
|---|---|---|
| EP | 0 218 750 | 10/1985 |
| JP | 04116093 | 4/1992 |
| WO | WO 97/40342 | 10/1997 |

OTHER PUBLICATIONS

"Notification of Transmittal of the International Search Report or the Declaration" in PCT/US00/19357, mailed Oct. 24, 2000, 7 pages in length.

* cited by examiner

*Primary Examiner*—Robert E. Pezzuto
(74) *Attorney, Agent, or Firm*—Stallman & Pollock LLP

(57) ABSTRACT

Methods for operating a laser scanning system. The laser scanning system can be used in construction projects to generate a field survey. An architect or engineer can use the field survey to create construction drawings. In addition, relevant points from the construction drawings can be identified at the construction site with the scanning system. Further, earth moving equipment can be controlled using the same information. The laser scanning system can also be used to determine if two parts can be mated together by scanning and comparing the parts that are to be mated. The laser scanning system can further be used to determine if an object can be moved through an opening in a structure by comparing scan points of the structure with scan points from the object. The laser scanning system can additionally be used to identifying objects within the site, to build databases that have relevant information about the objects, and to guide reproducing machines.

2 Claims, 5 Drawing Sheets

ADVANCED APPLICATIONS FOR 3-D AUTOSCANNING LIDAR SYSTEM

This application claims priority from provisional application 60/143,695 filed on Jul. 14, 1999 by Ben Kacyra and Jerry Dimsdale for Advanced Applications for 3-D Autoscanning Lidar System.

BACKGROUND OF THE INVENTION

1. Field of the Invention

The present invention relates to a laser scanning system and, more particularly, to a method for operating a 3-D autoscanning LIDAR system.

2. Description of the Related Art

It is often desirable to have computer models of large physical structures, such as a petroleum refinery. Computer models facilitate an understanding of the structure that is beneficial in a number of ways. One technique for constructing these computer models is to use a laser scanning system such as the system described in U.S. patent application Ser. No. 09/177,913. (The '913 application is a continuation of Ser. No. 08/638,961 which, in turn, is a continuation of International Application No. PCT/US97/06793. Application '06793 has International Publication No. WO 97/40342.)

The '913 system includes a combination laser scanner and PC software system that measures, visualizes and models large structures and sites with high speed, high accuracy and over a large range. In use, the device is oriented towards the scene and the user selects the desired measurement area and measurement point spacing. A detailed 3-D geometry of exposed surfaces is remotely captured in the form of a dense, accurate, three dimensional point cloud.

The '913 system includes a passively Q-switched pulsed laser. The laser beam is scanned over the target using computer-controlled galvo scanning mirrors. The system includes a video monitor for capturing the scene and displaying it on a computer such as a laptop. Using this video image, the operator can select the area to be scanned by the laser.

The galvo mirrors direct the laser through repeated vertical scans, moving over horizontally after each vertical scan. By accurately monitoring the time of flight of each laser pulse out from the device and back into the device, exact positional information of the target can be calculated.

Each measured point has associated with its 3-D information in the point cloud. The system software can display the point cloud to the user. As discussed herein in greater detail, the point cloud can be used to directly carry out a number of procedures. In addition, the system can process the point clouds into wire meshes, 3-D models and 2-D drawings for export to popular computer-aided design (CAD) rendering or other software.

In the '913 application, some basic real-world examples were discussed. For example, it was suggested that the system could be used to create a three dimensional image of a construction site or a building. This 3-D data could be viewed directly or used to generate CAD drawings.

Because of the high speed and accuracy of the system, further applications have been developed which can greatly benefit from these features. This patent application is intended to describe some of these concepts.

SUMMARY OF THE INVENTION

The present invention provides a method for operating a laser scanner. The method includes the step of scanning a site with the laser scanner to create a field survey that has a number of scan points. The method also includes the step of creating a drawing of a structure that has a number of defined points that are positionally related to the scan points in the field survey.

The method further includes the step of rescanning the site with the laser scanner to obtain rescan data. The rescan data corresponds to a number of the scan points. The method additionally includes the step of registering the rescan data with the defined points from the drawing to form registered data. The method also includes the steps of identifying a location of interest from the registered data, and illuminating a location at the site with a laser beam from the laser scanner that corresponds with the location of interest.

In another aspect of the present invention, the method begins with the step of scanning a site with a laser scanner to obtain a number of rescan points that define a first structure. The method further includes the steps of scanning a second structure built to be mated to the first structure to obtain a number of mating points, and comparing the rescan points with the mating points to determine if the second structure can be mated to the first structure.

In a, further aspect of the present invention, the method starts with the step of scanning a site with the laser scanner to obtain a number of scan points that define an opening in a structure. The method additionally includes the steps of scanning an object to be placed within the structure to obtain a number of object points, and comparing the scan points with the object points to determine if the object can be moved through the opening to be placed within the structure.

The present invention also includes a method for grading a tract of land, which has a natural surface, with a programmable earth mover. The method includes the steps of positioning a laser scanner on the tract of land to scan the tract of land, and scanning the tract of land with the laser scanner to define a plurality of first points on the natural surface of the tract of land. The laser scanner having a position in a coordinate system. The first points having positions in the coordinate system and elevation measures of a project.

The method further includes the step of generating a grading plan for the tract of land where the grading plan defines a to-be-constructed surface that differs from the natural surface. The method also includes the step of defining a plurality of second points on the to-be-constructed surface where the second points have positions in the coordinate system and elevation measures of the project. The to-be-constructed surface described by the second points has a corresponding surface described by the first points.

The method additionally includes the step of comparing the elevation measures of specific points on the to-be-constructed surface described by the second points with the elevation measures of points on the corresponding surface described by the first points to define cut points and fill points in the coordinate system. A cut point is defined when the elevation measure of a second point is less than the elevation measure of the corresponding first point. A fill point is defined when the elevation measure of a second point is greater than the elevation measure of the corresponding first point.

The method further includes the step of determining a position of the earth mover in the coordinate system. The method additionally includes the step of operating the earth mover to form the constructed surface by removing earth from the cut points and adding earth to the fill points in response to the information derived from the comparison.

In another aspect of the present invention, the method begins with the step of scanning a site with the laser scanner to obtain a number of scan points. The method also includes the steps of identifying objects within the site by comparing the scan points to predefined geometric objects, and issuing commands based on the identification of the objects.

In a further aspect of the present invention, the method starts with the step of scanning a structure with the laser scanner to obtain a number of scan points. The method additionally includes the step of generating a model of the structure from the scan points. The model, in turn, includes a number of objects. The method further includes the step of adding data links to each object. The data links refer to externally available information about the objects.

In an additional aspect of the present invention, the method begins with the step of scanning an object with the laser scanner to obtain a number of object points. The method also includes the steps of creating a model of the object from the object points where the model includes reproduction information, and controlling a reproducing machine in response to the reproduction information to reproduce the object.

A better understanding of the features and advantages of the present invention will be obtained by reference to the following detailed description and accompanying drawings that set forth an illustrative embodiment in which the principles of the invention are utilized.

DETAILED DESCRIPTION

The assignee of the subject application has developed an integrated 3-D imaging and modeling system which is marketed under the trademark CYRAX. This system is described in detail in PCT application WO 97/40342, published Oct. 30, 1997, the disclosure of which is incorporated herein by reference.

Figure 1:
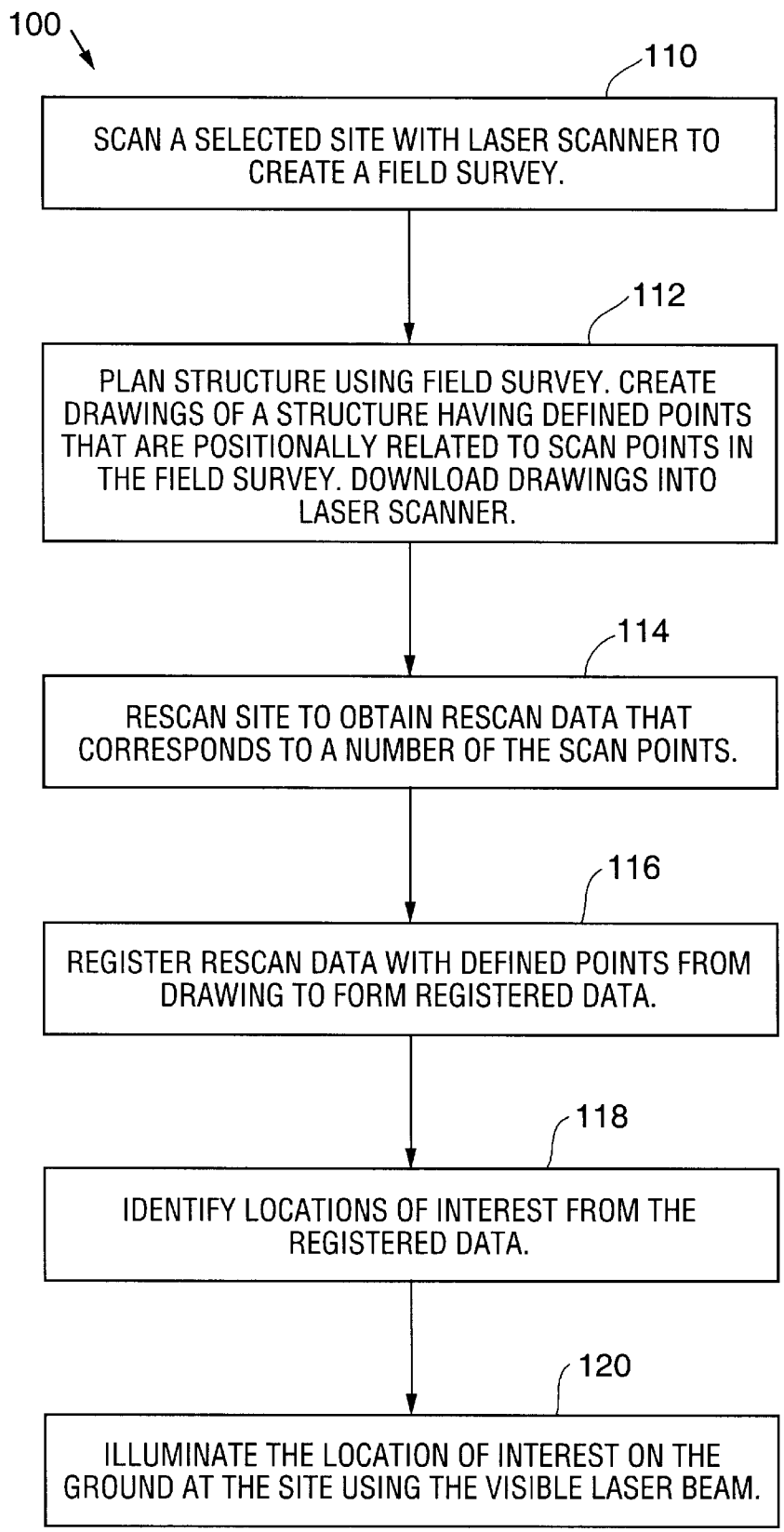
FIG. 1 is a flow chart 100 illustrating an example of the operation of a laser scanner to facilitate construction planning and monitoring in accordance with the present invention.

The Cyrax device or any similar device (i.e. any remote means of collecting a cloud of points) can be used at many stages of the construction process of a facility. FIG. 1 shows a flow chart 100 that illustrates an example of the operation of a laser scanner to facilitate construction planning and monitoring in accordance with the present invention.

As shown in step 110 of FIG. 1, once a site has been selected, the site is scanned with the laser scanner to create a field survey. This information can then be provided to the architect or engineer who, in step 112, plans and designs the structure based on the highly accurate data provided by the scanner.

The architect or engineer then creates a design drawing of the structure that has a number of defined points that are positionally related to the scan points in the field survey. After the architect or engineer has completed the design drawings for the structure, the drawings can be downloaded into the system using well known methods of CAD exchange. On an object by object basis, the geometric information can be converted from one format to another.

In a very important aspect of this disclosure, the system can help lay out the key features in the architect's design drawings on the actual construction site. To carry out this procedure, the system would be brought back to the site. As shown in step 114, the site is rescanned with the scanner to obtain rescan data that corresponds to a number of the scan points. The site can be completely rescanned or partially rescanned. In addition, specific targets with known geometric relationships to the new design can also be rescanned. Next, as shown in step 116, the rescan data, which includes the cloud of points or the specific targets, is then registered with the architect's plans stored in the system software to form registered data.

The process of registering the cloud of points or targets with the plans is well known in the art. Features in the scan data, whether they be surveying monuments, targets, or simple features in a scene (such as the vertex at a corner) are matched with known locations (in the drawing coordinate system) to determine the required transformation between the rescanned data and the drawing data. The resulting transformation can then be used to map drawing locations to real world locations that can be identified by the scanner.

As shown in step 118, after registration is complete, locations of interest are identified from the registered data. For example, an operator can highlight a location of interest, such as a corner of a wall on the plans, on the display screen of the scanner. Next, as shown in step 120, the system can illuminate the exact location in the field where the corner of the building is to be placed using the visible laser beam of the scanner as a marker.

The operator can then begin to stake out particular locations at the site where structural and other features from the architects plans are to be positioned. Note that this scan and targeting procedure will eliminate having surveyors manually determine where a feature should be placed from the plan and then manually measuring that information at the site.

The targeting aspect of the laser can be used to trace out all key features from the plans on the actual site, both before and during construction. For example, the visible laser can be used to target locations such as beams, doors or windows. The location of bolt holes could be marked.

In existing structures (or structures under construction) where a penetration in a wall or beam need to be made the following procedure can be used. Since the laser is controlled by scanning mirrors, it is not limited to illuminating single point. Rather, the laser can actually draw geometric shapes, such as lines, rectangles or circles where doors or windows might need to be placed.

In addition, an active or passive device can be used in conjunction with the laser system to identify points of interest that are located in open empty space. The active device would be carried by an operator who positions it in the path of the visible beam and walks with it along the beam until the exact range (i.e. the given point's position in space) is reached, at which time the device gives an audible or visual signal to the operator to stop and position a stake or a marker at that point in space.

The passive device would be used in a similar manner, except that the notification of reaching the desired position is given by the system itself instead of the target. This is achieved, for example, by the passive target continually reflecting the laser beam back, and such returns are compared by the system to the correct range and a signal is given when the returned range is equal to the correct range of the desired point.

Once construction has begun, the system can be used to periodically rescan the site. As shown in step 118 of FIG. 1, the site is rescanned with the laser scanner to obtain a number of rescan points that correspond to a number of the scan points and a number of the defined points. Then, in step 120, the rescan points are compared with the corresponding defined points.

This information can then be used to monitor the progress of the construction by comparing the rescan with the design model to determine the quantity and percentage of the work completed. In addition, the quantities of objects placed since the beginning of construction and/or since the last scan ca be calculated and reported.

In addition and more importantly, the scanned data can be compared to the stored design plans to determine if there are any deviations. Equally importantly, parts mating can be performed to determine if fabricated parts (which are usually fabricated at remote locations) will fit their designed or constructed support and tie points when delivered to the site.

Figure 2:
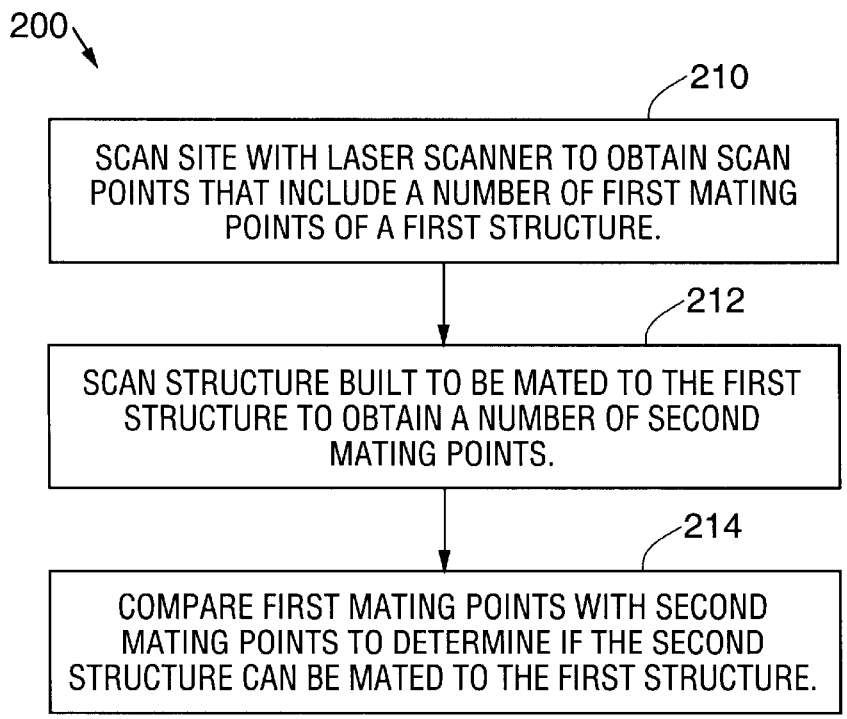
FIG. 2 is a flow chart 200 illustrating an example of the operation of a laser scanner with constructed parts in accordance with the present invention.

This process is performed by comparing scans of such fabricated parts with the stored design of the supports/tie points or, if the supports/tie points are constructed, compared with scans of such constructed items. FIG. 2 shows a flow chart 200 that illustrates an example of the operation of a laser scanner with constructed parts in accordance with the present invention.

As shown in step 210 of FIG. 2, a site is scanned with a laser scanner to obtain a number of scan points that define a first structure, the scan points, in turn, include a number of first mating points. In addition, at step 212, a second structure built to be mated to the first structure is scanned to obtain a number of second mating points. At step 214, the first mating points are then compared with the second mating points to determine if the second structure can be mated to the first structure.

It is known that construction errors alone typically account for anywhere between 8% and 14% of total project costs. By frequently surveying the construction site and comparing it with the plans or constructed components, one can minimize errors throughout the construction process. It is to be noted that the system can utilize bar codes and other similar devices as well as "smart chips" placed on objects in a scan to identify the object and any special information related thereto. Once the facility is built, the Cyrax system can be used to create "as built" drawings. The "as built" drawings can be updated over time as various modifications to the facility/equipment are being made.

The system would also be quite helpful in remodels or revamps. For example, to the extent that work needs to be done on a certain feature such as a piping system in a refinery, the system can scan the desired area and model that piping system and objects in its surrounding area.

The system can be used to model the piping and other pertinent objects in the area (such as pipe supports, vessels, etc.) to determine among other things, sizes, configuration, and locations. The designer, armed with that information and information about the required modifications, can use the system to complete the design by adding to the model the additional piping, components, and structures required and removing any piping, components, etc., as required. In other forms of remodeling, a constructability analysis might need to be performed.

Figure 3:
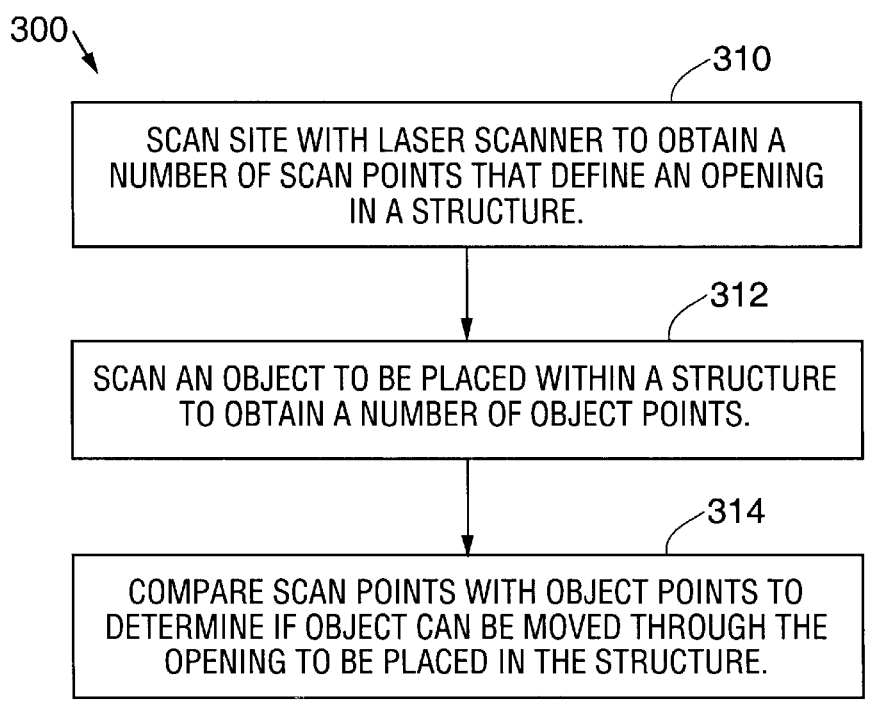
FIG. 3 is a flow chart 300 illustrating an example of the operation of a laser scanner for a constructability analysis in accordance with the present invention.

For example, one might need to determine if a new piece of equipment can be moved into place through existing doors and hallways. FIG. 3 shows a flow chart 300 that illustrates an example of the operation of a laser scanner for a constructability analysis in accordance with the present invention.

As shown in step 310 of FIG. 3, a site is scanned with a laser scanner to obtain a number of scan points that define an opening in a structure. In addition, at step 312, an object to be placed within the structure is scanned to obtain a number of object points. At step 314, the scan points are compared with the object points to determine if the object can be moved through the opening to be placed within the structure. Thus, by 3-D modeling the site and the new piece of equipment, one can virtually "walk" the new device through the structural barriers and determine if it fits. Similarly, if a part of a wall needs to be cut out and moved through existing doors, the device will allow the operator to visualize whether such a move was feasible.

The functionality of the system also lends itself to machine control functions. Machines are often controlled by robotic vision systems. The advantage of the device relates to its 3-D capabilities, long range capability, accuracy, detail, portability and software functionality. For example, the system can be used to guide earth moving equipment such as a bulldozer or grader to perform its work much more efficiently than manual control by a human operator. The following examples of such utilization are given.

Figure 4:
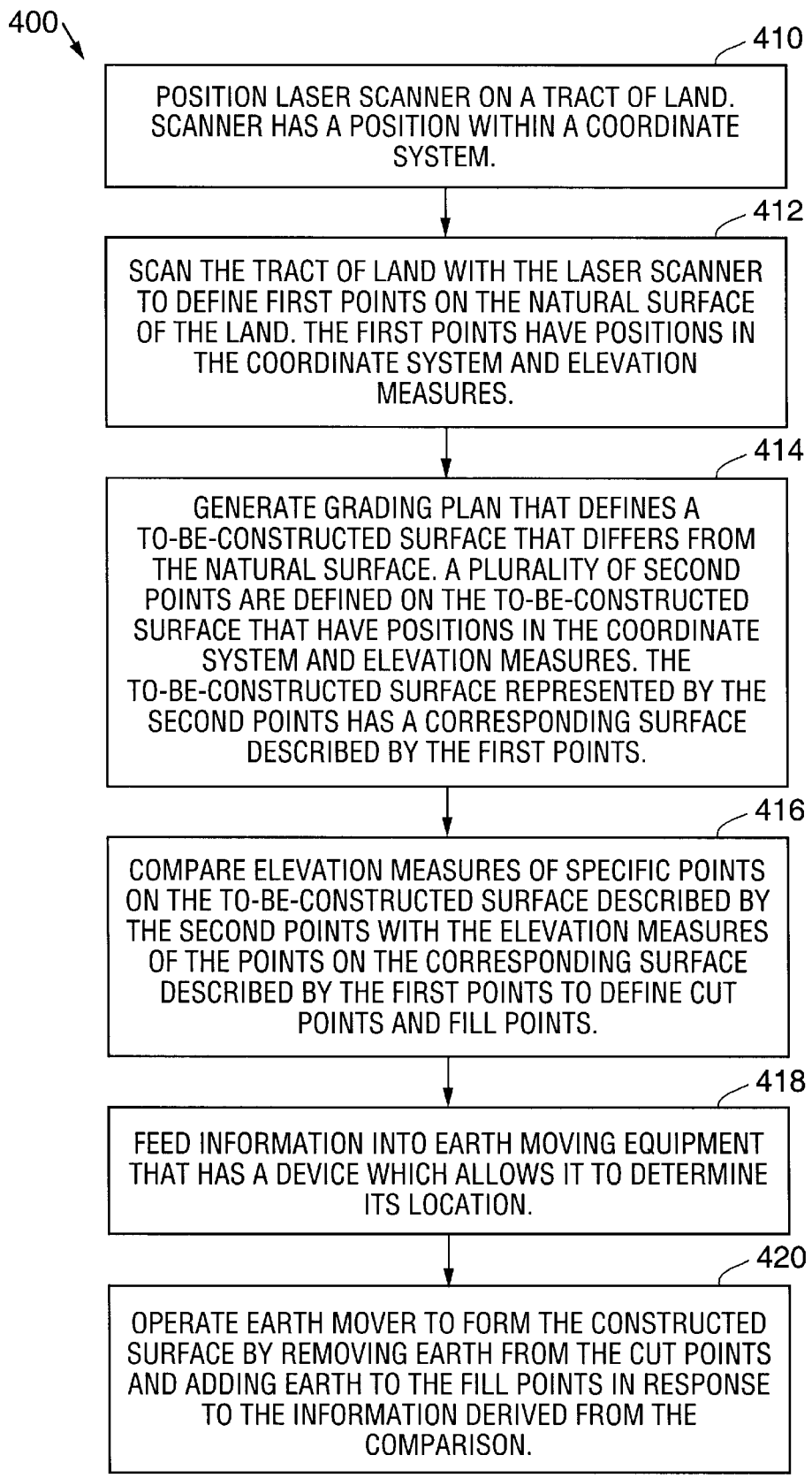
FIG. 4 is a flow chart 400 illustrating an example of the operation of a laser scanner for controlling an earth mover in accordance with the present invention.

FIG. 4 shows a flow chart 400 that illustrates an example of the operation of a laser scanner for controlling an earth mover in accordance with the present invention. As shown in step 410 of FIG. 4, a laser scanner, which has a position in a coordinate system, is positioned on the tract of land to scan the tract of land. Next, at step 412, the tract of land is scanned with the laser scanner to define a plurality of first points on the natural surface of the tract of land. The first points have positions in the coordinate system and elevation measures of the project.

At step 414, a grading plan for the tract of land is generated by the design architect/engineer. The grading plan defines a to-be-constructed surface that differs from the natural surface. In addition, a plurality of second points are defined on the to-be-constructed surface. The second points have positions in the coordinate system and elevation measures of the project. Further, the surface described by the second points has a corresponding surface described by the first points.

At step 416, the elevation measures of specific points on the surface described by the second points are compared with the elevation measures of the corresponding points on the surface described by the first points to define cut points and fill points in the coordinate system. A cut point is defined when the elevation measure of a second point is less than the elevation measure of the corresponding first point, while a fill point is defined when the elevation measure of a second point is greater than the elevation measure of the corresponding first point.

Thus, the system is used to perform an initial scan of the existing terrain, the scanned cloud of points is compared to the final design which is stored in the system, and the exact depth of cut/fill are determined at very close intervals throughout the terrain. At step 418, this information is fed into an earth moving equipment that has a device which allows it to determine its location in space (in the coordinate system) at any given time (such as a GPS system).

At step 420, the earth mover is operated to form the constructed surface by removing earth from the cut points and adding earth to the fill points in response to the information derived from the comparison. The earth mover can be operated as described in U.S. Pat. No. 5,631,658 which is hereby incorporated by reference. As a result, the combined information allows the equipment to be operated with little operator intervention.

The system can also obtain its position by mounting the scanning system on the equipment. A scan of the original terrain is performed and cut/fill areas are determined as described above. In this case, the system, being mounted on the earth moving equipment, can scan control targets or monuments placed on the ground (with known locations relative to the scan of the original terrain as well as to the new design). This information allows the system to guide the equipment without the use of other location devices, to perform its operations at the required locations and depth.

The system can also be used in underground mining operations. The system, mounted on a mine drilling equipment can scan the area to be drilled. This 3-D scan information will give the system detailed knowledge of the location of the equipment relative to the mine shaft/walls. This information coupled with information about the desired depth and extent of cut, allows the system to determine the required moves and guide the equipment to perform the task. After the task is done, the system can do a second scan from the new location and determine the amount of material excavated and create a 3-D map of the new excavated area. It is to be noted that the same functionality can be achieved without the system being mounted on the equipment, as long as it can be placed in a location where the equipment and the areas to be excavated are in its field of view.

Figure 5:
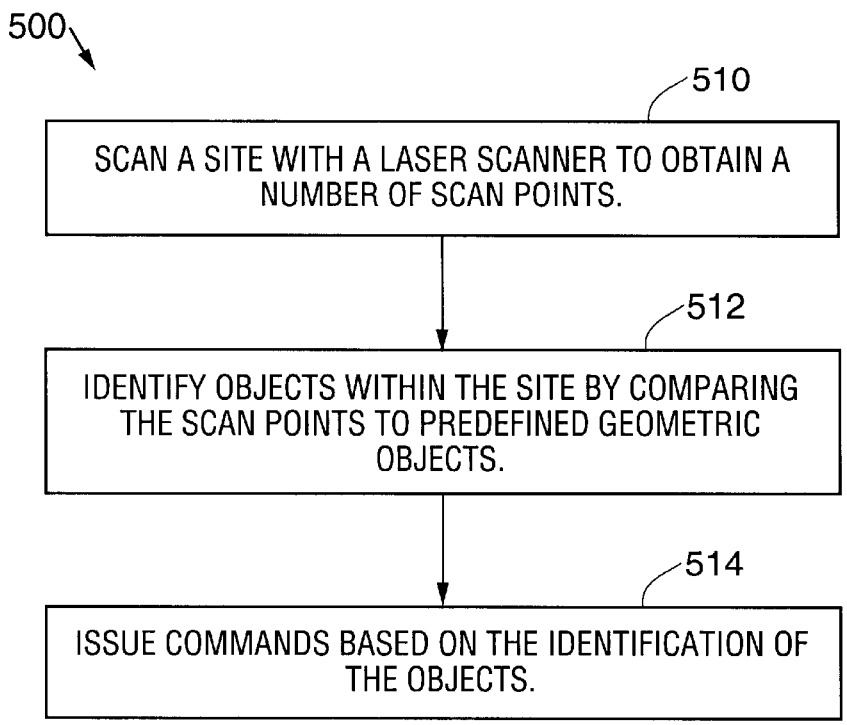
FIG. 5 is a flow chart 500 illustrating an example of the operation of a laser scanner for facilitating material handling in accordance with the present invention.

The system can also be used to facilitate handling of materials over long ranges. FIG. 5 shows a flow chart 500 that illustrates an example of the operation of a laser scanner for facilitating material handling in accordance with the present invention. As shown in step 510 of FIG. 5, a site is scanned with the laser scanner to obtain a number of scan points. Next, as step 512, objects within the site are identified by comparing the scan points to predefined geometric objects. Following this, at step 514, when an object is identified, commands are issued based on the identification of the objects.

This can be very important with moveable cranes used in the container industry. For example, by placing a device on the top of a moveable crane, the system can be used to scan the yard and image the various containers in the yard. The system can be used to identify the type of container which is to be moved. Once the type of container is identified, the appropriate sling can then be selected for holding the container. Thereafter, the system can be used to accurately position the grappling mechanisms to pick up and move the container.

In a similar manner as described above, the system can be used to guide robots in manufacturing and fabrication operations such as welding, cutting, painting, bin picking, etc. In shipping and similar cases, it can be used for ship or vehicle docking operations.

The system also has the ability to be operated remotely. This use can free engineering and other staff from time consuming travel by commanding the system to perform scans remotely via a network or modem connection. A technician is needed at the site to be scanned to position the system at the desired location. Once that is done, the remote operator can perform all the required functions remotely. In this mode, the system can be also used to scan radio active areas or areas that are environmentally contaminated. In addition, this remote capability allows the system to be mounted on a remotely operated roving vehicle or robot.

Figure 6:
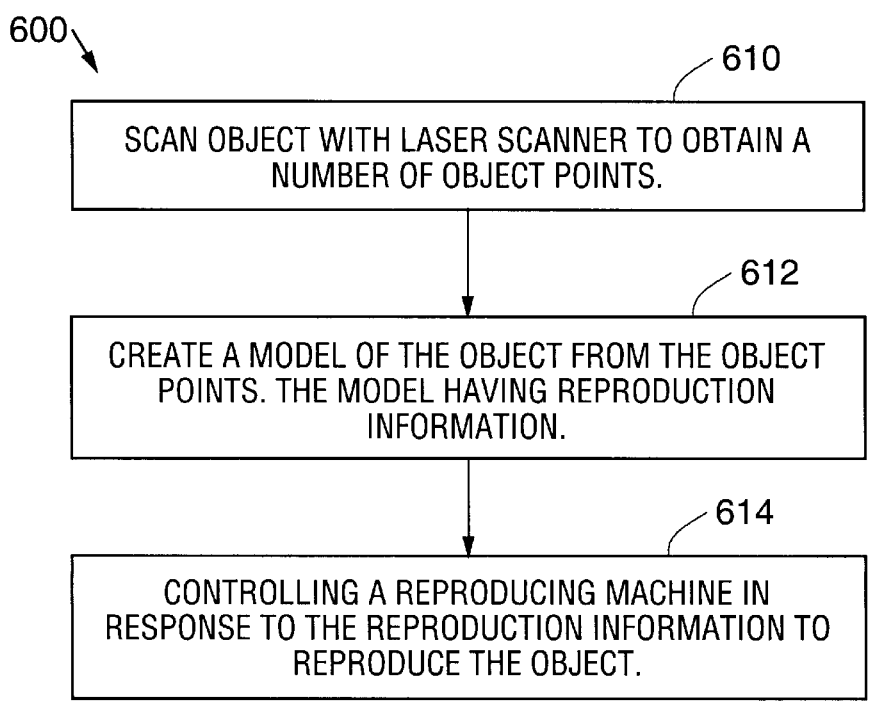
FIG. 6 is a flow chart 600 illustrating an example of the operation of a laser scanner for replicating existing parts in accordance with the present invention.

The system can also be used for replicating existing parts of structures, plants, ships, etc., that need replacement either during maintenance operations or during revamp. FIG. 6 shows a flow chart 600 that illustrates an example of the operation of a laser scanner for replicating existing parts in accordance with the present invention. As shown in step 610 of FIG. 6, an object is scanned with the laser scanner to obtain a number of object points. Next, at step 612, a model of the object is created from the object points. The model, in turn, includes reproduction information. In step 614, a reproducing machine is controlled in response to the reproduction information to reproduce the object.

For example, a custom bent pipe in a refinery or a ship needing replacement or duplication can be scanned. The system can produce rapidly an accurate model of the bent pipe and when connected to a computer controlled automated pipe bending (CNC) machine, can transfer that information to allow the machine to replicate the bend using a straight pipe. The system can scan the bent pipe after the operation is performed to determine its conformance to the original.

Figure 7:
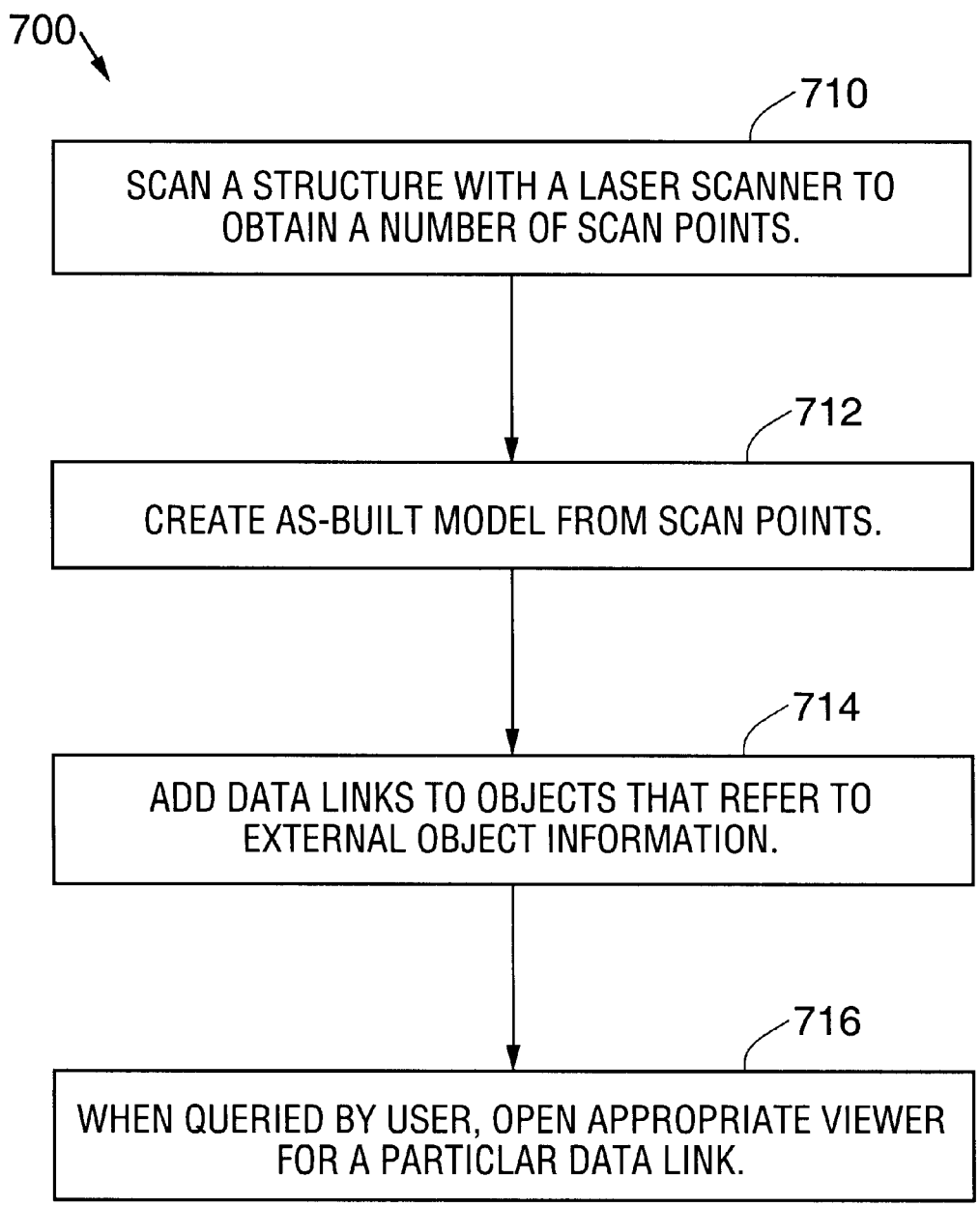
FIG. 7 is a flow chart 700 illustrating an example of the operation of a laser scanner for creating repositories of information about various objects in accordance with the present invention.

The device can also be used in conjunction with scanned and modeled "as built" structures to create repositories of information about the objects in the model. FIG. 7 shows a flow chart 700 that illustrates an example of the operation of a laser scanner for creating repositories of information about various objects in accordance with the present invention. As shown in step 710 of FIG. 7, a structure is scanned with the laser scanner to obtain a number of scan points. At step 712, an as-built model is created from the scan points. The model, in turn, has a number of objects. At step 714, data links are added to each object. The data links refer to externally available information available about the objects, and any number of types of data can be linked. In step 716, a system user can view data from data links by opening a viewer appropriate for the type of data referred to by that particular link.

For example, the various objects in a model created from a scan can be tied to external database information which might give, for example, purchase information such as the age of a valve, when it was installed, the type of valve, the manufacturer, as well as other types of information. Another link to external information could provide access to the available inventory of replacement parts by accessing information in an external database, or any other source of online information. Similarly, the inspection history or maintenance records could be linked into the object. By tying all this information together, plant managers can keep abreast of all the details of the plants, use the system for management, inspection and maintenance planning, and for operator and other staff training. This is extremely important where the workforce is transient. In this case, changes are often made over time to the structure and the people responsible for the changes are no longer available to question how those changes were made. In addition to the above-mentioned advantages, the system has the ability to allow more efficient management thus cutting operating costs.

As mentioned earlier, the system can use bar codes or other similar passive or active devices attached to the objects being scanned to automatically acquire additional information about such objects such as model number, in service date, maintenance history, etc.

In addition to the capabilities mentioned earlier, the system, acting as a "3-D browser", can allow users to view information contained in the data links stored within the object. The viewers are the appropriate programs for the particular data link. For example, a link to a vendors web site would be viewed by launching a web browser. A link to a drawing file would be viewed by opening the appropriate drawing viewer. A link to an external database would present the results directly in a window. Furthermore, the system is designed to include a server database which allows the model to be stored in a central location to be accessed by multiple users anywhere to work on the model, or use the model to access data or to launch other applications relating to the model or its objects. The system's database has locking and versioning capabilities to safeguard the integrity of the data while allowing multiple users to work on it simultaneously.

As noted in the above-identified PCT application, the system includes sophisticated software capable of converting the 3-D cloud of points into CAD-type drawings. In operation, the cloud of points can be segmented into real world geometric figures. These geometric figures can then more easily be converted into CAD models.

The 3-D point cloud can also be used directly to carry out a number of procedures without segmentation into geometric shapes. In some cases, the direct use of the point cloud can be more advantageous.

It should be noted that each point in the cloud has coordinates associated therewith. The distances between each point can be directly determined from the data. These relationships permit many of the procedures discussed above to be performed directly from the point cloud. For example, comparing the progress of construction from one day or another can be done in comparing one set of point clouds to another set of point clouds. The data in the point clouds is very dense and, therefore, can provide additional information.

The system can generate contours and cross sections from the cloud of points in real time. It can also develop 2-D plan, elevations, and sections directly and in real time from the cloud of points. In addition to collecting geometric information about scanned surfaces, the system also collects surface intensity information. This information allows the cloud of points to be used to identify and map surfaces of differing reflectance properties, such as rusting areas on object surfaces, and mineral areas on mine surfaces. This capability can also map sudden changes in surface normals such as the two sides of a cracked surface, and can also identify blemishes (such as gouges) in materials.

It should be understood that various alternatives to the embodiment of the invention described herein may be employed in practicing the invention. Thus, it is intended that the following claims define the scope of the invention and that methods and structures within the scope of these claims and their equivalents be covered thereby.

What is claimed is:

1. A method for grading a tract of land with a programmable earth mover, the tract of land having a natural surface, the method comprising the steps of:

positioning a laser scanner on the tract of land to scan the tract of land, the laser scanner having a position in a coordinate system;

scanning the tract of land with the laser scanner to define a plurality of first points on the natural surface of the tract of land, the first points having positions in the coordinate system and elevation measures of a project;

generating a grading plan for the tract of land, the grading plan defining a to-be-constructed surface that differs from the natural surface;

defining a plurality of second points on the to-be-constructed surface, the second points having positions in the coordinate system and elevation measures of the project, the to-be-constructed surface described by the second points having a corresponding surface described by the first points;

comparing the elevation measures of specific points on the to-be-constructed surface described by the second points with the elevation measures of points on the corresponding surface described by the first points to define cut points and fill points in the coordinate system, a cut point being defined when the elevation measure of a second point is less than the elevation measure of the corresponding first point, a fill point being defined when the elevation measure of a second point is greater than the elevation measure of the corresponding first point;

determining a position of the earth mover in the coordinate system; and operating the earth mover to form the constructed surface by removing earth from the cut points and adding earth to the fill points in response to the information derived from the comparison.

2. The method of claim 1 wherein a number of the first points are targets with defined geometric relationships.

* * * * *